US005565121A

United States Patent [19]

Forslund

[11] Patent Number: 5,565,121

[45] Date of Patent: Oct. 15, 1996

[54] ARRANGEMENT FOR RELIEVING STRESS ON ELECTRIC ELEMENTS IN SEATS AND A METHOD FOR ASSEMBLING THE ARRANGEMENT

[75] Inventor: Göran C. Forslund, Koppom, Sweden

[73] Assignee: Scandmec A.B., Mullsjo, Sweden

[21] Appl. No.: 276,056

[22] Filed: Jul. 15, 1994

[51] Int. Cl.[6] ........ B60L 1/02

[52] U.S. Cl. ........ 219/217; 219/541; 219/529; 439/333

[58] Field of Search ........ 219/202, 217, 219/528–529, 541, 549; 297/180.12; 439/333, 341, 347, 492, 495

[56] References Cited

U.S. PATENT DOCUMENTS

| | | | |
|---|---|---|---|
| 3,812,847 | 5/1974 | Moore et al. | 128/9 |
| 4,650,965 | 3/1987 | Lawson | 219/217 |
| 4,713,020 | 12/1987 | Awano et al. | 439/495 |
| 4,952,256 | 8/1990 | Schauer et al. | 439/492 |
| 4,964,674 | 10/1990 | Altmann et al. | 219/217 |
| 5,041,015 | 8/1991 | Travis | 439/492 |
| 5,051,366 | 9/1991 | Anderson et al. | 439/492 |
| 5,213,534 | 5/1993 | Gardner et al. | 439/495 |
| 5,231,758 | 8/1993 | Schauer | 439/492 |

OTHER PUBLICATIONS

Horton, J. A., Flexible Laminated Tape Cable Connector, IBM Technical Disclosure Bulletin, vol. 5 No. 11 Apr. 1963.

*Primary Examiner*—Teresa J. Walberg
*Assistant Examiner*—Raphael Valencia
*Attorney, Agent, or Firm*—Jeffrey Slusher

[57] ABSTRACT

An arrangement for relieving stress on a connection between external electrical conductors and at least one electric element such as a heating wire that is contained in a generally sheet-shaped, bendable carrier in a vehicle seat has a holding piece and a cowering piece. The ends of internal conductors leading to the electric element are preferably soldered to flat-pin contacts, which are on the ends of the electrical conductors, and which are located in recesses in the holding piece. The holding piece has pins that extend through holes in the carrier and into mating openings in the covering piece. The carrier, the ends of the internal electrical conductors, and the ends of the external electrical conductors are clamped securely into place by being sandwiched between the holding and covering pieces. Pins extend from the holding piece, through holes in the carrier, and into mating openings in the covering piece. The ends of the pins are then heat-flattened to lock the pieces together. Where the electric element is multi-layer, a covering piece is mounted on either side of the holding piece.

12 Claims, 2 Drawing Sheets

ARRANGEMENT FOR RELIEVING STRESS ON ELECTRIC ELEMENTS IN SEATS AND A METHOD FOR ASSEMBLING THE ARRANGEMENT

BACKGROUND OF THE INVENTION

1. Field of the Invention

This invention relates to an arrangement for relieving stress on the connection between electrical conductors and an electric element that is contained in a generally flat, bendable, elastic carrier when manufacturing seats, as well as a method for assembling the arrangement.

2. Background Art

Seats often contain one or more electric elements or circuits that are used, for example, to heat the seat or to sense whether someone is sitting in the seat. Such electric elements are particularly common in vehicle seats. These elements or circuits must be connected to an external electrical system such as a vehicle's power supply or display circuitry: First, power supply leads must be connected to the elements; and second, where the elements include sensors, the output signals from the sensors must be led from the seat to other circuitry elsewhere in the vehicle.

The elements or circuits in seats are typically mounted on or embedded in a generally flat, sheet-like carrier or base that is installed in the seat. One of the functions of the carrier is to locate, fix and isolate each element its entire extent so that it does not short circuit itself or come into contact with other electrically conducting materials. The carrier must also shield and protect the element, in part so that the person sitting in the vehicle seat does not feel it and in part so that the load on the seat is not enough to break it altogether. The carrier must therefore be bendable, elastic, and rugged enough to withstand the stresses that arise.

Electrically heated vehicle seats, for example, normally have one or more loops of heating wire that are supplied with electrical energy via a thermostat or an adjustable control. The carrier in known seat-heating assemblies is typically formed of two layers of fabric that surround the heating wire. One of these fabric layers may be coated with a foam material such as polyester foam. The heating wires in such a known seat-heating assembly are usually connected to a contact device that makes it possible to connect the assembly easily to the electrical system of the vehicle when the seat is mounted in the vehicle. The contact device also makes it possible to break the connection with the vehicle's electrical system if the seat has to be removed from the vehicle.

It has been found possible to at least partially automate the manufacture of seat-heating assemblies in order to lower the manufacturing costs. Using known assembly methods, several heating loops are laid out on a web of material. A second material web is then joined with the first material web by gluing and pressing. The joined web is then stamped into suitably shaped pieces, which form complete assemblies after electrical contact devices are mounted on them.

Because this manufacturing process includes pressing and stamping, it has been necessary to mount the contact devices as the last step in the manufacturing chain. Mounting the contact devices has hitherto been done in such a way that the two material layers of the carrier are manually pulled apart enough to expose the ends of the resistive wires, after which the conductors of the contact device are connected to these exposed ends by twisting or soldering. This final work step is both time-consuming and work-intensive and this in turn has meant that the manufacturing cost of each seat-heating assembly has been relatively high. Efforts to provide for a secure assembly in a less costly manner have also been hindered by the stringent requirements for the ability of the assembly to resist tensile stresses: the electrical conductors must normally be able to withstand tensile forces of approximately 250–300 N. Similar production methods are used, and similar problems arise, when the seat assembly includes other types of electrical elements in the seats.

What is needed is therefore an arrangement for relieving mechanical stress when connecting the electrical conductors in a seat-heating assembly and a method for assembling the arrangement that makes it possible to completely automate the manufacturing procedure.

SUMMARY OF THE INVENTION

The invention provides such an arrangement for relieving stress on a connection between at least one external electrical conductor leading to a vehicle seat and a corresponding number of internal conductors in at least one electrical element, such as a loop of heating wire or a capacitive sensor, that is contained in a generally sheet-shaped, bendable carrier in the seat. An electrical contact device is mounted on an end of each external electrical conductor, and an end of each internal conductor is electrically connected, preferably by soldering, to each electrical contact device. A holding piece that is mounted on a first side of the carrier has a substantially planar supporting portion, which has recesses that receive the electrical contact devices. A covering piece is mounted on the side of the carrier opposite the holding piece. A clamping structure securely clamps together the holding piece and the covering piece and thereby clamps the carrier, the electrical contact devices, and the ends of the internal conductors securely between the holding piece and the covering piece.

In the preferred embodiment, the clamping structure includes a plurality of openings in the covering piece and a corresponding plurality of pins that extend from the holding piece, through holes made in the carrier, and into corresponding ones of the openings in the covering piece. The pins are preferably cylindrical, the openings are preferably circular, and the holding piece and the covering piece are clamped together by heat-flattened ends of the pins where they extend through the openings.

To increase the security of the clamping, the holding piece and the covering piece preferably have respective clamping surfaces. A plurality of indentations such as dimples are provided in a first one of the clamping surfaces and a corresponding plurality of protrusions such as pips is provided on a second one of the clamping surfaces. The protrusions extend toward the indentations when the holding piece and the covering piece are clamped together, and in the case in which the carrier has a woven structure, the pips will also extend through the openings in the weave.

The electrical contact devices are preferably cable grips of the flat-pin connector type and a detent structure such as a tab is preferably provided on each cable grip to keep the conductor from being pulled out of its recess in the holding piece.

In the preferred embodiment, the holding piece has a base portion and a supporting portion. The recesses are thereby in the supporting portion. The base portion is thicker than the supporting portion and has, for each of the electrical conductors, a channel opening into a corresponding one of the recesses, through which channel the electrical conductor extends.

The supporting portion preferably has an expansion recess into which the carrier expands when the holding piece and the covering piece are clamped together.

An alternative embodiment is also provided for applications where the electrical elements has more than one layer, such as the two layers of a capacitive sensor. In this embodiment, there is a covering piece for each side of the holding piece. The holding piece thereby has recesses and openings for external and/or internal electrical conductors on both sides. Pins can extend either from both sides of the holding piece into the covering pieces, or they can extend from one of the two covering pieces, through holes in one layer of the electrical element, through openings in the holding piece, through holes in the other layer of the electrical element, and into openings in the other covering piece.

DETAILED DESCRIPTION

The arrangement according to the invention may be used to advantage with any form of electrical element or device that is mounted in or on a lamina-shaped, supporting carrier. The invention is described below mainly in the context of a heated vehicle seat by way of example only. This same embodiment may be used to relieve stress on the connection between an external electrical system and other electric elements as well; modifications that make the invention suitable for use in other applications where there is more than one electric element, where it has more or fewer than two internal electrical conductors, and where it is in multiple layers, are also described.

The figures illustrate an embodiment of the invention in which a resistive heating wire is to be connected to external power supply conductors of a vehicle's electrical system. According to the invention, the heating wire may be laid out in any pattern; a wavy, "sine-wave" pattern is preferred since it provides good heat distribution over the seat while allowing the wire to accommodate the bending and flexing of the carrier when a passenger sits on the seat. Instead of a wire, the resistive heating element may instead be in the form of a foil strip.

Figure 1:
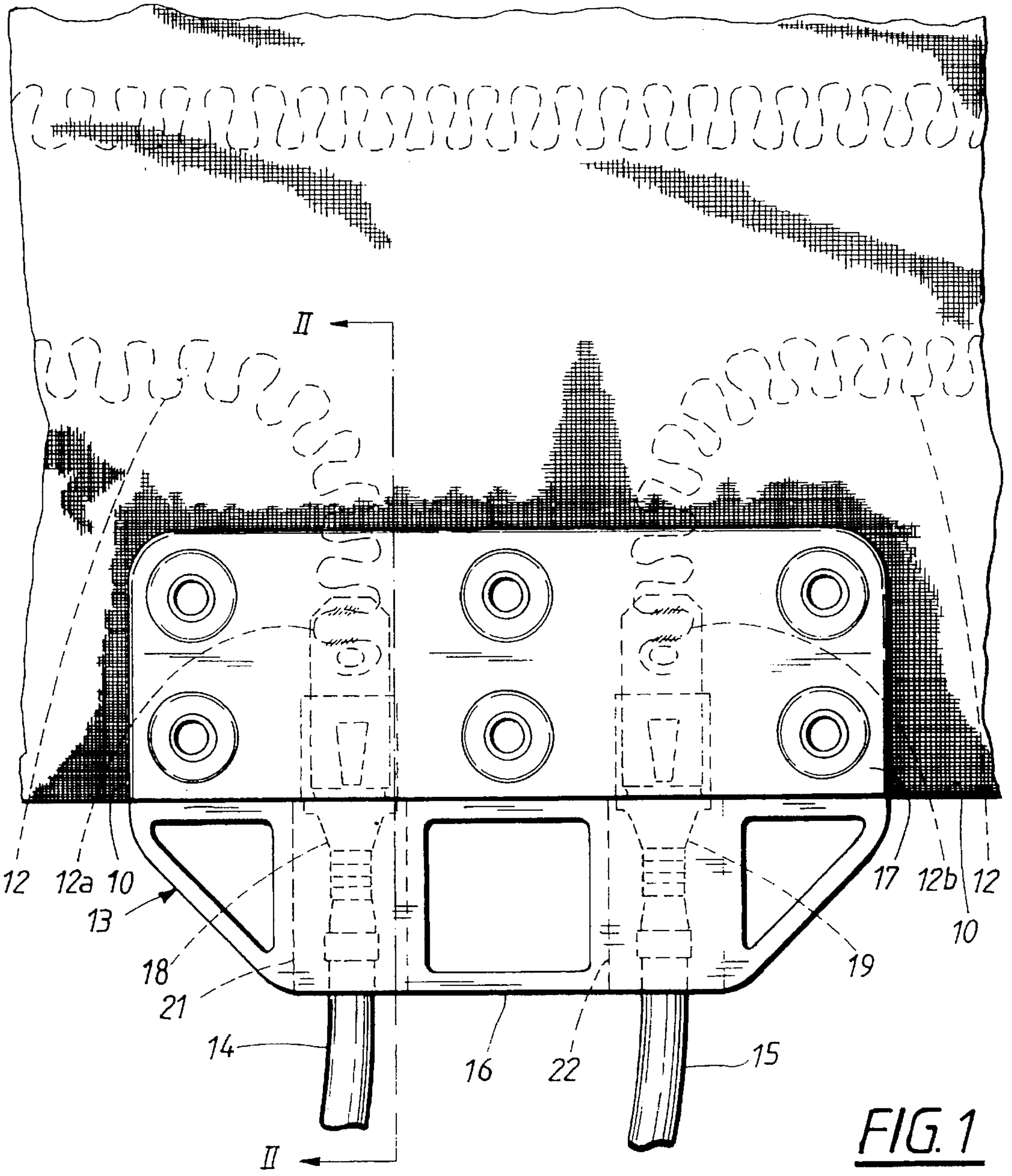
FIG. 1 is a plan view on an enlarged scale that shows an arrangement for relieving mechanical stress according to the invention, mounted on a heating wire carrier.
Figure 2:
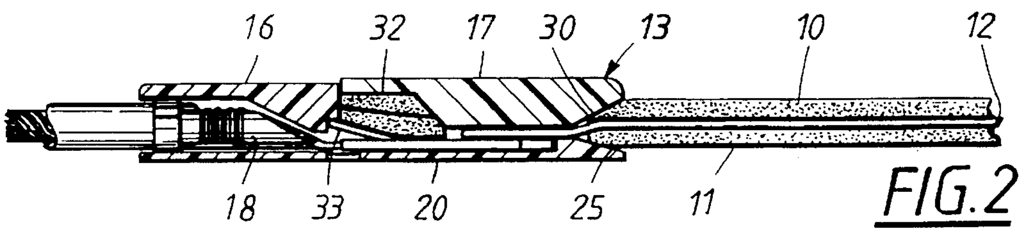
FIG. 2 is a cross sectional view taken along the line II—II in FIG. 1.

As FIGS. 1 and 2 show, the carrier in the preferred embodiment consists of two layers 10, 11 of a material such as a woven fabric or a synthetic web that is preferably coated on one side with polyester foam and a self-adhesive coating or layer. The heating wire 12 is fixed in the self-adhesive layer so that it is "sandwiched" between the two material layers 10, 11.

A tensile stress-relieving device 13 creates a connection that resists tensile stress between the two ends 12*a*, 12*b* of the heating wire and electrical conductors such as cables 14, 15, which supply electrical current to the wire 12 from the electrical system (not shown) of the vehicle. The stress-relieving device includes a holding piece 16 and a covering piece 17, as well as two cable shoes or grips 18, 19, which are preferably of the flat-pin connector type. The flat-pin connector type is preferred because it is easy to solder to and is easy to recess into the structure of a holding piece (see below), but other shapes may also be used. What is important is that the cable grips each have an electrical contact plate or surface for each end of the heating wire.

In other applications of the invention, the electric element in the seat will not itself be in the form of a wire. For example, if the electric element is a capacitive sensor, it will include a pair of mainly flat, opposing, plate-like members, which will be separated by a dielectric such as air, the carrier itself, or some other material layer supported by the carrier. In such cases, internal conductors will extend from the element to be connected to the external conductors 14, 15 and the ends 12*a*, 12*b* will simply be the ends of these internal conductors. "Internal conductors" are thus those that are physically connected to or are integral with the electric element in the seat, whereas "external conductors" are those such as the cables 14, 15 that extend to the seat from the rest of the electrical system of the vehicle.

The holding piece 16 and the covering piece 17 are preferably made of a synthetic, electrically non-conductive plastic material (for example, a copolymer such as acetal or one of the polyacetals) that is able to withstand without cracking at least the weight of a typical passenger. The generally rectangular shape of the holding and covering pieces shown in the figures (see in particular, FIGS. 3 and 4) the holding and covering pieces shown in the figures provides a secure assembly that efficiently relieves stress on the electrical connections in the seat-heating assembly while being easy to form with little waste of material. Other shapes may, however, be chosen depending on the particular application. As is mentioned below, it is also possible to manufacture both the holding piece 16 and the covering piece 17 as a single unit.

Furthermore, the holding piece may also include a thermostat (not shown) for regulating the supply of current to the heating wire depending on the temperature of the vehicle seat. A temperature sensor may thereby be incorporated into the seat, and the wires from the sensor may also be secured using the invention. In other applications, the holding piece 16 (or covering piece 17) may house or provide a mount for a circuit board that contains signal conditioning circuitry for processing or applying, for example, the capacitance signal from a capacitive sensor, the drive or control signals for a seat-shaping mechanism, or the power, control, or sensing signals to or from some other type of electric element in the seat. In still other applications, the electric element in the seat may itself be or contain a printed circuit or other stiff plate—the invention is well suited to relieve stress on the connection between the external electrical conductors and the internal conductors leading from such devices.

The holding piece 16 has a generally planar supporting portion 20 that extends outward in the direction of the cable grips. The supporting portion is preferably thinner than the rest of the holding piece. the thicker portion of the holding piece (to the left of the covering piece 17 as seen in FIG. 2). As FIG. 2 shows, this allows the upper surface of the assembly to be substantially even and smooth when the covering piece and the holding piece are mounted together.

Two channel-like spaces 21, 22 extend through the thicker portion of the holding piece 16. The spaces receive the ends of the cables 14, 15, which are stripped of insulation, and the clamping connection (described in greater detail below) for the cable grips 18, 19. In applications in which only one external cable is required, only one space 21 or 22 will be needed. The supporting portion 20 has a preferably flat clamping surface 23 (see FIG. 3). The flat pins of the cable grips fit into recesses 24 in the supporting portion so that the upper contact surface of each cable grip lies in the plane of (that is, is flush with) the clamping surface 23 of the holding piece 16. The surface 23 also has an angled or bevelled edge 25, whose function is described below.

Figure 3:
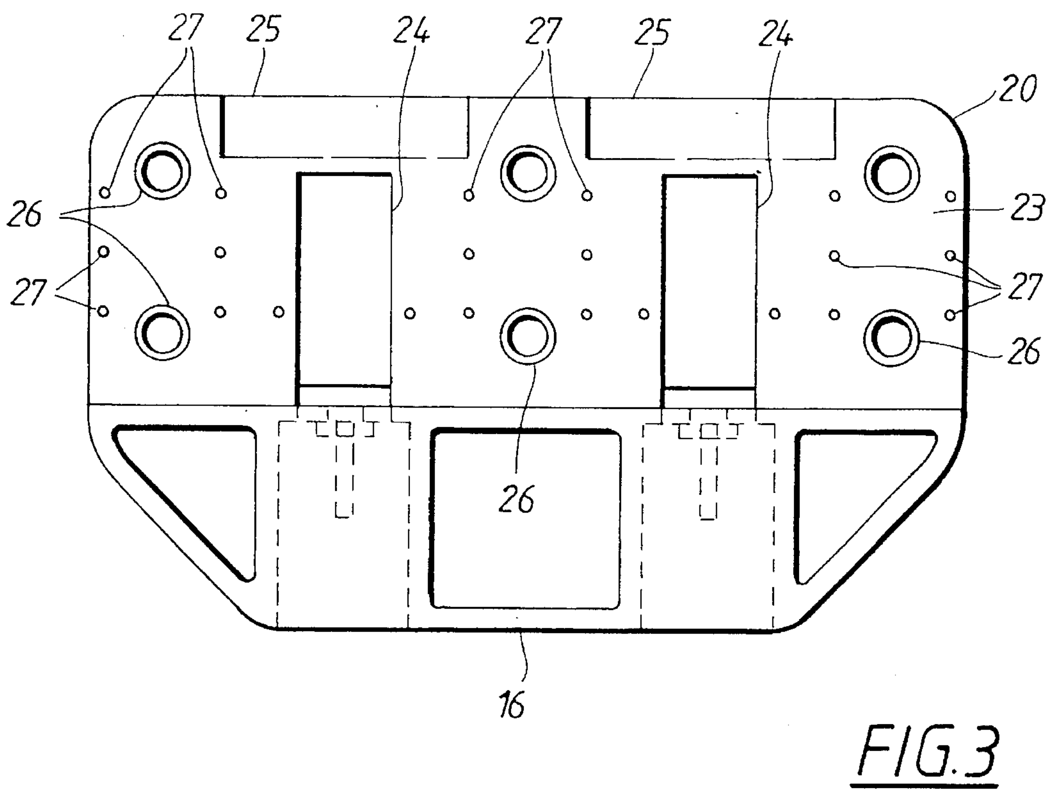
FIG. 3 shows a plan view of a holding piece in the stress-relieving arrangement according to the invention.

As FIG. 3 shows, several pins 26 extend out from the clamping surface 23 of the holding piece 16. In the illustrated embodiment, six generally cylindrical or tubular pins are shown, but the number and shape of the pins may be varied according to the application as long as they align properly and mate securely with an equal number of openings (described below) in the covering piece. Furthermore, the surface 23 is provided with a large number of small indentations such as dimples 27.

Figure 4:
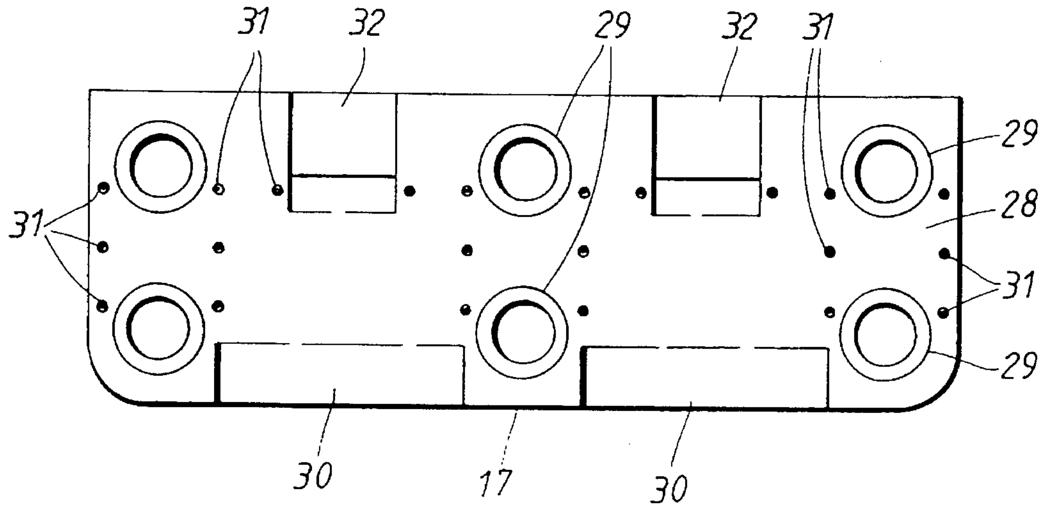
FIG. 4 shows, in a similar manner, a covering piece of the stress-relieving arrangement.

As FIG. 4 shows, the covering piece 17 has a second, generally flat clamping surface 28 and openings 29, one for each of the pins 26. The clamping surface 28 also has an angled or bevelled edge surface 30, which corresponds to the edge surface 25 (see FIG. 2). The surface 28 also has a large number of small, preferably conical, pips 31, which fit into the dimples 27. In the illustrated embodiment, the pips 31 are on the covering piece 17 and the dimples with which they mate are on the holding piece 16. This may be reversed, that is, the pips 31 may be formed on the clamping surface 23 of the holding piece and the dimples may be formed in the clamping surface 28 of the covering piece.

Furthermore, in addition to or instead of the pips and dimples, the surfaces 23 and 28 may be made somewhat rough to better hold the carrier between the holding and covering pieces. Also, instead of pips and dimples, the surfaces 23, 28 may be provided with mating ridges and grooves or protrusions and corresponding indentations of some other shape. One advantage of pips, however, is that they will provide actual mechanical locking (rather than just friction) if the carrier is of a material with a weave large enough that the pips extend through the carrier into the dimples.

The covering piece 17 also has two recesses 32, which serve as spaces into which the carrier 10 may expand when the assembly is completed. The covering piece 17 does not have to be a part separate from the holding piece 16, but rather it can be joined with the supporting portion 20 along a line about which it can rotate like a hinge. Moreover, instead of the pins 26 that are shown in the figures, a snap-in arrangement can be used for locking the covering piece onto the supporting portion 20.

One mounts the tensile stress-relieving device onto the carrier in the following manner (see FIGS. 3 and 4): Since the pins 26 of the holding piece 16 will need to extend into the openings 29 in the covering piece 17, they will also have to pass through the carrier. Holes or perforations are therefore first made in the carrier 10 for the pins 26; furthermore, at least one hole should also be made in the carrier to expose each end 12*a*, 12*b* of the heating wire. The holes should preferably be made as small as possible so that there will be as little damage as possible to the carrier material.

The supporting portion 20 of the holding piece 16 is then mounted on the one side of the carrier 10 so that the pins 26 stick through the holes made in the carrier, and so that the flat pins of the cable grips lie against the exposed ends 12*a*, 12*b* of the heating wire. The wire ends are then soldered securely onto respective ones of the flat pins. The cover piece is then mounted on the opposite side of the carrier so that the pins 26 of the holding piece extend into the openings 29 in the covering piece while the covering piece and the holding piece are pressed together.

The assembly is then completed by securing the holding and covering pieces together in place by heat-upsetting (that is, heat-thickening or heat-flattening) the ends of the pins. Alternately, in embodiments in which the covering piece snaps onto the holding piece, the assembly is completed by snapping the pieces securely together. As yet another alternative, the ends of the pins 26 could be split and pointed with detent flanges, like split arrow-heads or cones, so that the pins would snap into and lock into the openings 29. This would provide mechanical locking with no need for heating, but heat-upsetting the ends of the pins will normally make the ends smoother, that is, with no protruding points that may be uncomfortable or chafe any part of the assembly or seat.

When assembled, the tensile stress-relieving device according to the invention will appear as in FIG. 2, in which one can see that the cable grip 18 is locked against being pulled out of the holding piece 16 by a detent tongue or tab 33 that is formed as a punched-out and upwardly bent portion of the flat pin of cable grip. The engagement of the carrier 10 by the tensile stress-relieving device can also be seen.

Tensile stress on the heating wire 12 is minimized in part by the locking (by the detent tabs or tongues 33) of the cable grips against being pulled out of the holding piece 16, in part by securely soldering the wire ends onto the respective flat pins, and in part by the mechanical engagement (clamping) of the stress-relieving device 13 with the carrier 10.

Mechanical engagement between the stress-relieving device and the carrier is provided for in several different ways: first, the pins 26 extend through the holes in the carrier; second, the pips 31 extend from the clamping surface 28, through the carrier 10 and into the dimples 27 (or from the surface 23 if the pips are on the holding piece and the dimples are on the covering piece); third, the holding piece and the covering piece clamp the carrier between them, especially where the edge surfaces 25 and 30 "pinch"; and fourth, by the expansion of portions of the carrier 10 (see FIGS. 1 and 2) into the spaces 32.

The assembly process described above can be carried out in a completely automated manner using a conventional mounting robot that makes the holes in the carrier 10, for example, by punching or heating. Application of the holding piece, soldering of the wire ends, and mounting of the cover piece are also steps that can be easily carried out by the robot.

In the illustrated embodiment of the invention, there is only one heating wire 12 and two electrical conductors 14, 15, with a flat-pin connector cable grip or shoe 18, 19 for each end of the wire. By widening the holding piece 16 and the covering piece 17 as needed and providing in the holding piece more channel-like spaces 21, 22 and recesses 24 for additional conductors, the arrangement according to the invention can accommodate more than two conductors and more than one heating wire. Similarly, the invention can relieve stress on the connection between the external conductors of an external electrical system and the internal electrical conductors of more than one electric element in the seat: as one example given above, the ends of the heating wires and signal wires from a temperature sensor can be secured in the same structure with the holding piece 16 and the covering piece 17. In such cases, it may also be necessary to have more pins 26 and openings 29 to make sure that the holding and covering pieces are held together securely.

In certain applications, the electrical element has more than one layer, such as the two layers of a capacitive sensor. The invention may be readily adapted to provide secure electrical contact even in such application. In the embodiment of the invention that is preferred for such applications, there is a covering piece 17 for each side of the holding piece 16 (see FIGS. 3 and 4). The holding piece thereby has recesses 24 (see FIG. 3) and openings 21, 22 for external and/or internal electrical conductors on both sides. Pins 26 (see FIG. 3) can extend either from both sides of the holding piece into the covering pieces, or they can extend from one of the two covering pieces, through holes in one layer of the electrical element through openings in the holding piece, through holes in the other layer of the electrical element, and into openings in the other covering piece. The embodiment can then be locked together in the same way as before, that is, by heat-thickening the pins or by snapping in the covering pieces onto the holding piece if a snap-in arrangement is provided.

I claim:

1. A stress-relieving arrangement having a connection between at least one external electrical conductor and a corresponding number of internal electrical conductors that are connected to at least one electrical element that is contained in a generally sheet-shaped, bendable carrier in a seat, wherein the improvement comprises:

A) an electrical contact device mounted on a connection end of each external electrical conductor and electrically connected to an attachment end of a respective one of the internal electrical conductors;

B) a holding piece that is mounted on a first side of the carrier and has:

1) a substantially planar supporting portion; and 2) for each electrical contact device, a recess that receives it;

C) a substantially planar covering piece that is mounted on a second side of the carrier, which is opposite the first side; and D) clamping means for securely clamping together the holding piece and the covering piece and thereby for clamping the carrier, each electrical contact device, and the attachment end of each internal electrical conductors securely between the holding piece and the covering piece and thereby for absorbing tensile stress on the attachment end of each internal electrical conductor.

2. An arrangement according to claim 1, in which the clamping means comprises:

A) a plurality of openings in the covering piece; and

B) a plurality of pins that extend from the holding piece, through holes made in the carrier, and into corresponding ones of the openings in the covering piece such that each pin extends through one of the openings.

3. An arrangement according to claim 2, in which the pins are cylindrical, the openings are circular, and the holding piece and the covering piece are clamped together by heat-flattened ends of the pins.

4. An arrangement according to claim 1, in which:

A. the holding piece and the covering piece have respective clamping surfaces;

B. a plurality of indentations is provided in a first one of the clamping surfaces; and C. a plurality of protrusions is provided on a second one of the clamping surfaces, the protrusions extending toward the indentations when the holding piece and the covering piece are clamped together by the clamping means.

5. An arrangement according to claim 1, in which the seat is a vehicle seat and the electrical element is a heating wire.

6. An arrangement according to claim 5, in which the heating wire has ends, each of which is soldered to a respective one of the electrical contact devices.

7. An arrangement according to claim 1, in which:

A) the holding piece has a base portion and a supporting portion;

B) each recess is in the supporting portion;

C) the base portion is thicker than the supporting portion, and has, for each external electrical conductor, a channel opening into the corresponding recess, through which channel the external electrical conductor extends.

8. An arrangement according to claim 7, in which the supporting portion has an expansion recess into which the carrier expands when the holding piece and the covering piece are clamped together.

9. An arrangement according to claim 1, further comprising:

detent means for preventing pulling-out of each electrical contact device from the corresponding recess in the holding piece.

10. An arrangement as defined in claim 1, in which at least one internal electrical connector is an end portion of the heating wire.

11. A method for assembling an arrangement for relieving stress on a connection between at least one external electrical conductor and a corresponding number of internal electrical conductors that are connected to at least electric element that is contained in a generally sheet-shaped, bendable carrier in a seat, in which the arrangement includes a holding portion, from which extend a plurality of pins, and a covering portion, which has a plurality of openings for receiving the pins, the method comprising the following steps:

A. making a hole in the carrier for each of the pins and at least one hole that exposes ends of each internal electrical conductor;

B. positioning electrical contact devices, one of which is electrically connected to each end of the external electrical conductors, in recesses in the holding piece;

C. mounting the holding portion onto the carrier with the pins extending through the respective holes in the carrier and the exposed ends of the internal electrical conductors in contact with corresponding ones of the electrical contact devices;

D. soldering the ends of the internal electrical conductors to the respective electrical contact devices;

E. mounting the covering piece on a side of the carrier opposite the holding piece the so that the pins extend through the openings in the covering piece, thereby clamping the carrier, each end of each internal electrical conductor, and the electrical contact devices between the holding piece and the covering piece; and F. locking the covering piece together with the holding piece by heat-flattening the pins where they extend through the openings.

12. A stress-relieving arrangement having a connection between at least one external electrical conductor and a corresponding number of internal electrical conductors that are connected to at least one electrical element that is contained in a generally sheet-shaped, bendable carrier in a seat, wherein the improvement comprises:

an electrical contact device mounted on a connection end of each external electrical conductor and electrically connected to an attachment end of a respective one of the internal electrical conductors;

a holding piece that is mounted on a first side of the carrier and has:

a substantially planar supporting portion; and for each electrical contact device, a recess that receives it;

a substantially planar covering piece that is mounted on a second side of the carrier, which is opposite the first side;

clamping means for securely clamping together the holding piece and the covering piece and thereby for clamping the carrier, each electrical contact device, and the attachment end of each internal electrical conductors securely between the holding piece and the covering piece and thereby for absorbing tensile stress on the attachment end of each internal electrical conductor, in which:

the clamping means comprises:

a plurality of openings in the covering piece;

a plurality of pins that extend from the holding piece, through holes made in the carrier, and into corresponding ones of the openings in the covering piece such that each pin extends through one of the openings;

the holding piece and the covering piece have respective clamping surfaces;

a plurality of indentations is provided in a first one of the clamping surfaces;

a plurality of protrusions is provided on a second one of the clamping surfaces, the protrusions extending toward the indentations when the holding piece and the covering piece are clamped together by the clamping means;

the seat is a vehicle seat;

the electrical element is a heating wire;

the heating wire has ends, each of which is soldered to a respective one of the electrical contact devices;

detent means are provided for preventing pulling-out of each electrical contact device from the corresponding recess in the holding piece;

the holding piece has a base portion and a supporting portion;

each recess is in the supporting portion; and the base portion is thicker than the supporting portion and has, for each external electrical conductor, a channel opening into the corresponding recess, through which channel the external electrical conductor extends.

* * * * *